S. OTIS.
RAILWAY CAR.
APPLICATION FILED MAR. 29, 1918.
1,348,515.
Patented Aug. 3, 1920.
2 SHEETS—SHEET 1.
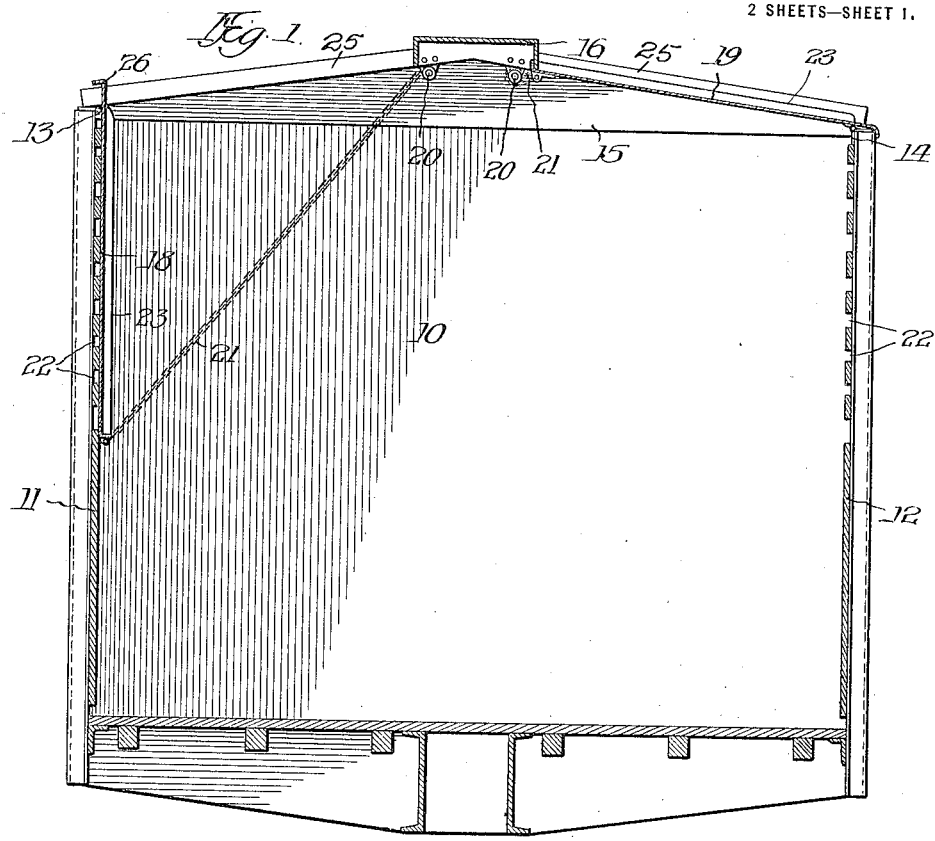
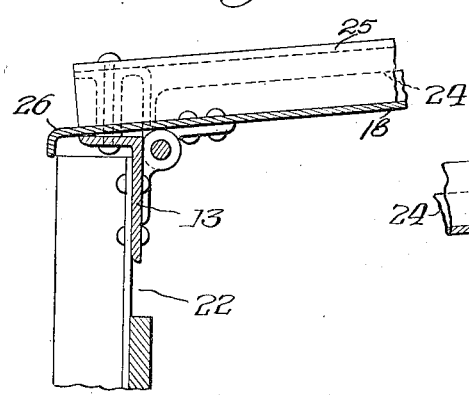
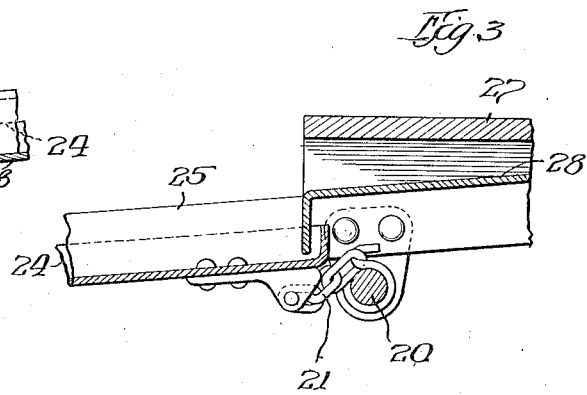
WITNESSES:
Chas. L. Byron
Fed. C. Levison
INVENTOR.
Spencer Otis
BY Wilkinson & Huxley
ATTORNEYS S. OTIS.
RAILWAY CAR.
APPLICATION FILED MAR. 29, 1918.
1,348,515.
Patented Aug. 3, 1920.
2 SHEETS—SHEET 2.
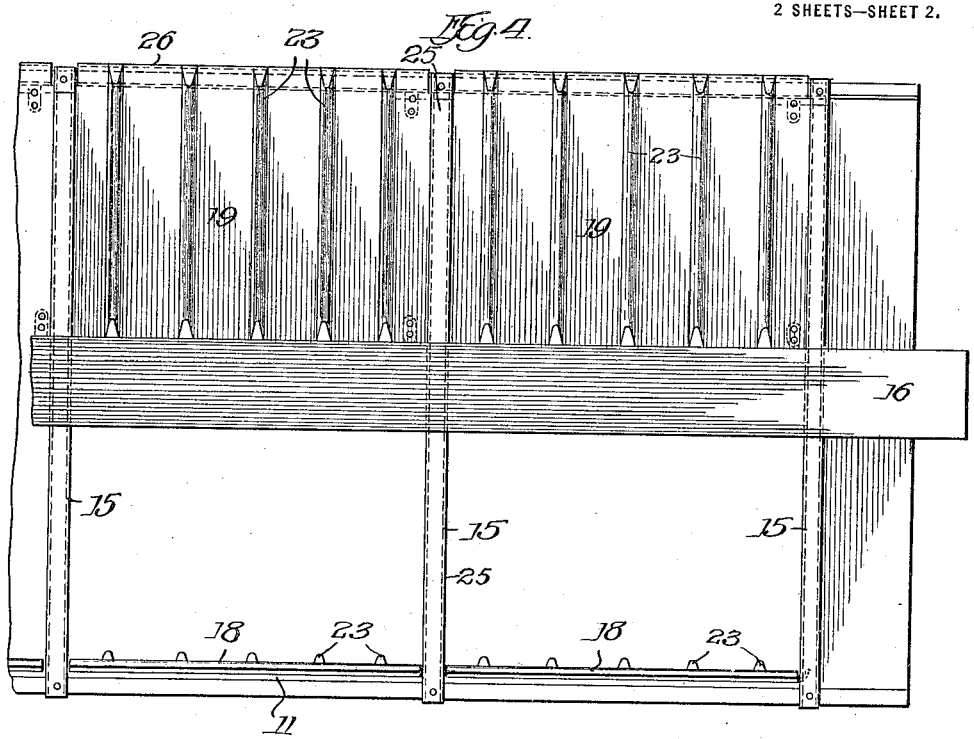
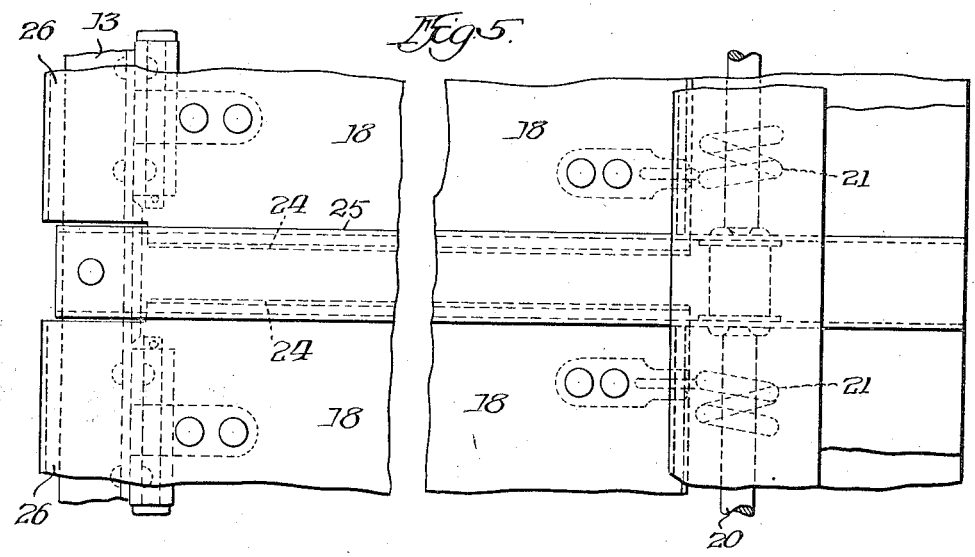
INVENTOR.
Spencer Otis,
BY Wilkinson & Huxley
ATTORNEYS

UNITED STATES PATENT OFFICE.

SPENCER OTIS, OF CHICAGO, ILLINOIS, ASSIGNOR TO NATIONAL DUMP CAR COMPANY, A CORPORATION OF MAINE.

RAILWAY-CAR.

1,348,515.  Specification of Letters Patent.  Patented Aug. 3, 1920.

Application filed March 29, 1918. Serial No. 225,401.

*To all whom it may concern:*

Be it known that I, SPENCER OTIS, a citizen of the United States, and resident of Chicago, in the county of Cook and State of Illinois, have invented certain new and useful Improvements in Railway-Cars, of which the following is a specification.

This invention relates to railway cars and more particularly to a roof construction therefor including doors.

One object of this invention is to facilitate the loading of cars.

Another object is to improve car roof door construction.

Another object is to provide a car roof construction whereby the doors thereof may be moved into coöperative association with a slatted car side to prevent leakage therethrough.

Another object is to provide novel car roof doors and their connection to the roof structure in a manner to meet the various requirements for successful commercial operation.

Generally speaking these and other objects are accomplished by providing a railway car roof construction including a pivotally mounted door whereby the car may be loaded in an efficient manner.

The invention is illustrated on the accompanying sheets of drawings, in which—

Figure 1 is a transverse sectional view of a freight car embodying my invention.

Fig. 2 is a fragmentary detail sectional view showing, among other things, the pivotal connection of the doors in the car roof.

Fig. 3 is a fragmentary detail sectional view of the central part of the roof construction showing a form slightly modified from that shown in Fig. 1, the roof door being shown in its closed position.

Fig. 4 is a fragmentary plan view of the car, and

Fig. 5 is a fragmentary plan view of the car roof construction on an enlarged scale.

The various novel features of my invention will be apparent from the following description and drawings and will be particularly pointed out in the appended claims.

Railway freight cars have been provided with various door arrangements whereby the cars may be loaded. In many cases the arrangements, especially where the doors are located in the roof, are not as satisfactory in use as they might be. It sometimes happens that the only available freight cars have their upper side portions slatted for ventilation purposes, and where it is desired to load the car with material which may be relatively fine, leakage will occur through the slatted sides. Accordingly, I have provided a car roof construction which not only greatly facilitates loading of cars but also one which will permit the doors to move down into operative association with the slatted sides of the car to prevent leakage therethrough.

By referring to the figures of the drawings, it will be noted that I have shown a freight car 10 having sides 11 and 12, the upper portions of which are slatted for ventilation purposes or otherwise. The roof of the car includes longitudinally extending side members 13 and 14, at points along the length of the car, are carlines 15, the central portions of which receive and support a longitudinally extending ridge cap 16, which also forms the running board. At each side of the central portion of the car there are provided a plurality of roof doors 18 and 19, the doors being pivotally connected to the longitudinally extending supporting member 13 and the doors 19 being pivotally connected to the longitudinally extending member 14, said doors being mounted for a swinging movement downwardly and outwardly with respect to the longitudinal center of the car.

The doors 19 are shown in their raised or closed position and are held or sustained in such position by their operating mechanism including a shaft 20 and chain 21, the chain in each instance being operatively connected to the shaft and also to the inner end of the door 19. The shaft in each case, preferably is located under the ridge cap and may be operated in any suitable manner for actuating the doors. When it is desired to open the doors, the shafts 20 are released to permit the doors to swing downwardly into the car as a result of their own weight. The doors 18, as shown in Fig. 1, are in their open position wherein the same cover the openings 22 in the slatted portion of the sides of the car to prevent leakage. It will be appreciated that when the doors are moved in their lower position the car may be loaded readily through the roof, and even if the lading is in the form of relatively fine material the same may be conveyed safely without leakage. The doors 18 and 19 may extend the full length of the car or there may be only one of these doors or there may be a plurality of the doors spaced at desirable distances from each other.

Preferably, the doors are made of pressed metal and have strengthening ribs 23 running transversely of the car, the doors also having at their sides flanged portions 24 which engage with the under sides of the transversely extending stop members 25 when the doors are in their raised or closed position. These stop members 25 overlie the ends of the doors in a manner to prevent rain or snow from coming into the car through the roof. The side flanges are continued around the free ends of the doors and are located inwardly with respect to the vertical flanges of the ridge cap. All water and snow which collect on the doors 18 and 19 will drain outwardly and drip off at the sides of the car. When the doors are open, such as doors 18, shown in Fig. 1 of the drawings, the tail portion 26 thereof extends slightly above the surface of the car roof thereby indicating that the door is open. When the doors are closed the tail piece 26 is flush with the sides of the outwardly extending roof portions.

By means of this arrangement the doors may be held in their raised or closed position in a simple manner and when released will swing down into open position at any desirable point or points along the length of the car to facilitate loading thereon. As a matter of fact, if desired, all of the doors on both sides of the roof may be open at a time whereby different portions of the car may be loaded simultaneously. Also by means of this arrangement of doors, leakage through the slatted sides of the car is obviated.

As mentioned above, the ridge cap and running board is in a single piece as shown in Fig. 1. If desired, however, the construction can be varied, as shown in Fig. 3, wherein the running board 27 is mounted over the ridge cap 28.

It is my intention to cover all modifications of the invention coming within the spirit and scope of the following claims.

I claim:

1. In a railway car having a permanent roof, the combination of a roof frame member, and a door pivotally connected thereto for a downward movement into the car whereby the car may be loaded.

2. In a railway car having a permanent roof, the combination of a roof frame member, and a door pivotally connected thereto for a downward and outward movement with respect to the center of the car whereby the car may be loaded.

3. In a railway car having a permanent roof, a roof structure including a pivotally mounted door movable downwardly in the car.

4. In a railway car having a permanent roof, a roof structure including a movably mounted door whereby the latter may be moved downwardly into the car to permit loading of the latter.

5. In a railway car, a side thereof having openings therein, and a door forming a part of the roof movable into a position to cover the openings.

6. In a railway car, a roof structure including a pivotally mounted door, and door operating means including a shaft extending lengthwise of the car adjacent the swinging edge of the door for sustaining the latter in one of its positions.

7. In a railway car, the combination of a roof frame member, a door pivotally connected thereto, and door operating means including a shaft extending lengthwise of the car adjacent the swinging edge of the door for sustaining the latter in its closed position.

8. In a railway car, a car body having a side with openings therein, and a roof, a portion of the latter of which may be dropped down against the side of the car for closing said openings to make the side of the car tight.

Signed at Chicago, Illinois, this 22nd day of March, 1918.

SPENCER OTIS.

Witnesses:
MILTON T. MILLER,
B. C. BRIGHAM.